Aug. 27, 1935.  L. G. BATES  2,012,583
METHOD OF MANUFACTURING BOTTLES AND SIMILAR ARTICLES OF HOLLOW GLASSWARE
Filed June 6, 1934
*Fig.1.*
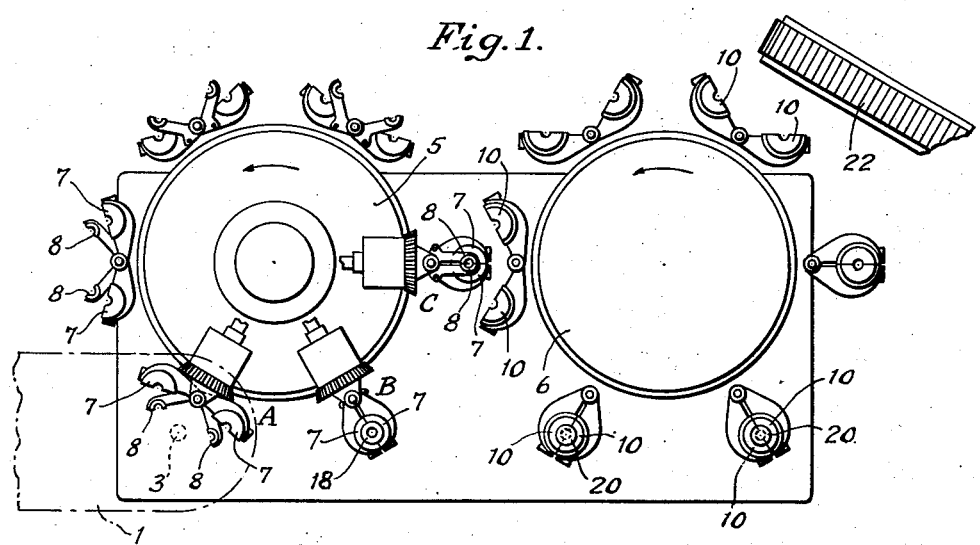
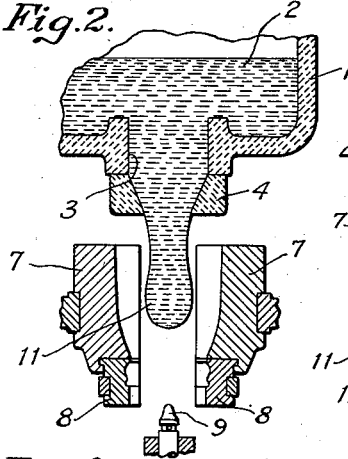
*Fig.2.*
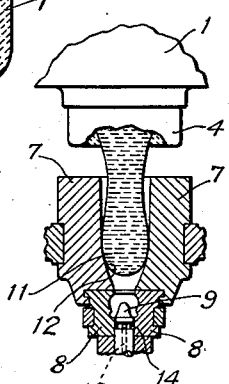
*Fig.3.*
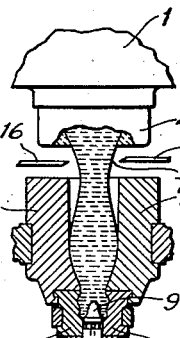
*Fig.4.*
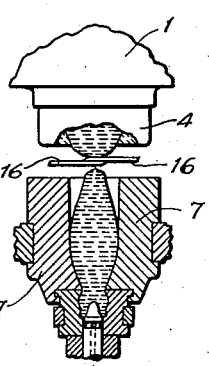
*Fig.5.*
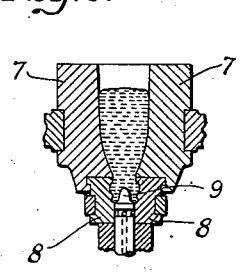
*Fig.6.*
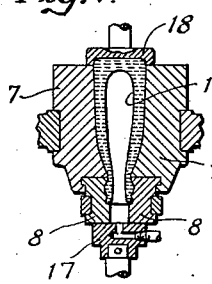
*Fig.7.*
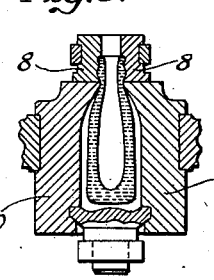
*Fig.8.*
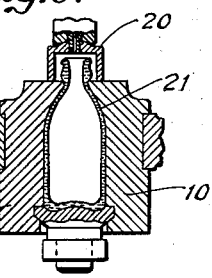
*Fig.9.*
Inventor:
Lloyd G. Bates
Witness:
A. A. Horn.
by Brown & Parham
Attorneys.

Patented Aug. 27, 1935

2,012,583

UNITED STATES PATENT OFFICE 2,012,583

METHOD OF MANUFACTURING BOTTLES AND SIMILAR ARTICLES OF HOLLOW GLASSWARE

Lloyd G. Bates, West Hartford, Conn., assignor to Hartford-Empire Company, Hartford, Conn., a corporation of Delaware Application June 6, 1934, Serial No. 729,240

9 Claims. (Cl. 49—77)

This invention relates generally to methods of manufacturing articles of hollow glassware, and more particularly to the manufacture of bottles and other articles of blown glassware by the use of feeding apparatus for producing molten glass charges and glassware forming apparatus for forming such charges into the desired articles of glassware.

It is now usual in the manufacture of bottles and similar articles of blown glassware to make use of a manufacturing assembly comprising an automatic "suspended charge" feeder of the type disclosed in the Peiler Patent No. 1,655,391, or its equivalent, together with one or more glassware forming machines, such for example as machines of the well known Lynch type of construction and operation.

The "suspended charge" feeder of such an assembly is operated so as to produce a series of similar charges, each of suitable temperature and viscosity for subsequent fabrication into the article desired, and each preformed as produced by the feeder, so that its external contour when it is cut off by the severing mechanism of the feeder will approximate as nearly as possible the contour of the cavity or of the portion of the cavity of the glassware forming machine mold for which that charge is intended. The preformed separated charge so produced should be delivered to its mold cavity by such means as will effect this operation with as little distortion or change of shape or differential chilling of the mold charge as possible. Such means may comprise a funnel. An anti-batting baffle or guide also usually is required to prevent an end portion of each charge from being knocked laterally from its intended path of movement as such charge is severed from its parent body of glass.

In general, a mold charge that requires the least change of shape or settling after it has been delivered to a mold cavity in order to contact at all points on its lateral and lower end surfaces with walls of the mold cavity is best adapted for expansion into the desired article of blown glassware, provided, of course, that the mold charge had a surface skin or enamel of substantially uniform thickness at the time it was delivered to the mold cavity.

The "suspended charge" feeding method assures delivery of all the glass of a charge to a mold cavity at practically the same instant and thus makes possible equal contact of all such surface portions of the charge with the adjacent portions of the walls of the mold cavity for the same length of time. This result is desirable but it is attained in "suspended charge" feeding because the entire charge is preformed and completed by the feeder while such charge is outside of the mold cavity for which the charge is intended.

An object of the present invention is to provide an improved method of feeding in which a portion of a charge suitable for a mold cavity is preformed in free suspension below the feeder outlet and the remainder of the charge is formed in the mold as part of an operation that is effective to fill a substantial portion of the mold cavity with glass of the preformed portion of the charge, thereby obviating any possibility of distortion or undesirable change of shape or condition of the mold charge between the time of its completion and the time of actual contact with the walls of the mold cavity and also obviating the necessity of providing suitable means for delivering a completed preformed charge to its mold cavity.

A further object of the invention is to obtain from glass issuing from a submerged feed outlet a mold charge suitable for the cavity of a mold that is to be charged and so produced that substantially the entire lateral and lower end surfaces of the charge will contact equally with the walls of the mold cavity for approximately the same length of time and such contact will have been established without any coiling, lapping or infolding of any surface portion of the charge and at the time such charge is separated from the supply glass.

A further object of the invention is to provide a method of obtaining from molten glass issuing downwardly through a discharge outlet that is submerged by glass of the supply body a series of mold charges, each appropriate for the cavity of the mold for which intended and each formed and separated from the oncoming glass without requiring the use of means such as heretofore employed in similar charge feeding operations periodically to accelerate and/or periodically to retard flow of glass through the discharge outlet.

In carrying out the invention, I make use of both the feeder and the mold to be charged as cooperative conjoint instrumentalities in controlling the formation of each mold charge as well as the actual continuing transfer of the mold charge as it is produced from the feeder to the mold. The feeder predetermines the approximate diameter and general shape of a substantial portion of the charge and the mold then is brought into operation and thereafter aids the feeder in controlling the production and form of the remainder of the charge. The charge, when separated from the oncoming glass, is already disposed within the mold and has been formed from its lower end nearly to its upper end exactly to fit the mold cavity.

Other objects and advantages of the invention will hereinafter be pointed out or will become apparent from the following description of a particular example of my novel method as it may be practiced by the use of apparatus such as is shown in the accompanying drawing, in which:

Figure 1 is a plan view showing a glass feeder and glassware forming apparatus relatively arranged for cooperation to manufacture bottles in accordance with the method of the present invention, the view being diagrammatic and all parts being omitted except such parts as are believed to be desirable to afford an understanding of the invention; and Figs. 2 to 9 inclusive are fragmentary more or less diagrammatic views, mainly in vertical section, illustrating various steps of the method of the present invention when performed by the use of apparatus shown in Fig. 1.

In the drawing, the numeral 1 designates a feeder forehearth. As best seen in Fig. 2, this forehearth, which may be of any suitable known construction, contains a supply body of molten glass 2, which submerges a discharge outlet 3 in the bottom of the forehearth. The effective size of the lower or discharge end of the outlet may be altered, as by removing the orifice ring 4 and replacing it with an orifice ring of a different size. Any suitable known means may be provided for retaining the orifice ring in place and the orifice or outlet structure may be of any suitable known construction.

The head of molten glass in the supply body 2 may be regulably controlled in any suitable known manner, as by a gate (not shown). Likewise, the temperature and condition of the glass in the feeder forehearth may be regulably controlled in any suitable known manner.

As shown in Fig. 2, the outlet 3 is entirely unobstructed and uncontrolled, the rate of issuance of glass therefrom being determined by gravity and head pressure and the viscosity of the glass at any particular time. If desired, a suitable valve, as for example, a normally stationary but vertically adjustable refractory implement (not shown) may be disposed in position to depend into the glass above or in the outlet passage so as to regulate the flow of glass through the outlet.

In Fig. 1, I show a glassware forming machine which, in general, is of the well known Lynch type of construction. This forming machine comprises a parison mold table 5 and an associate finishing mold table 6. The parison mold table 5 carries a plurality of parison molds, each of which may comprise a body portion consisting of separable half sections 7 and a neck forming portion consisting of separable half sections 8. The arrangement is such that the half sections of the body portion of the parison mold may be opened while the half sections of the neck forming portion of the mold remain closed but the closing of the halves of the body portion of the mold will effect closing also of the halves of the neck forming portion of the mold. This is a conventional form of construction in the type of glassware forming machine above referred to.

The parison mold table is located relatively to the feeder outlet 3 so that each intermittent rotary movement of the parison mold table 5 will bring one of the parison molds to a position, indicated at A, Fig. 1, directly below and at a predetermined distance from the lower end of the outlet 3. At the time such parison mold is brought to this position, which may be designated the mold charging station, the halves of both the body portion and the neck forming portion of the parison mold at the charging station may be open, as shown in Figs. 1 and 2. At this time, a neck pin 9 may be disposed in its lowered position below the outlet 3. A single neck pin 9 may be provided for cooperation with each of the parison molds when each mold is at the mold charging station. Such neck pin may be mounted so as to be capable of vertical movement independently of the mold at the charging station. A particular means for mounting the neck pin for cooperation with a parison mold at the charging station need not be illustrated in the drawings or described more particularly herein as suitable means for this purpose are well known in the art.

The finishing mold table 6 carries finishing molds, each of which comprises separable sections 10 and each of which is adapted for cooperation with a parison mold in a manner to be presently described.

In carrying out the present invention, the temperature and viscosity of the glass in the feeder forehearth 1 are controlled so that glass issuing by gravity and head pressure from the outlet 3 will accumulate in suspension from the outlet until it forms a pendant mass having a diameter at any place along its length not substantially less than that of the lower end of the outlet and having a length at least several times the diameter of the lower end of the outlet. The size of the outlet is selected in view of the diameter of the main portion of the cavity of the mold to be charged. The exact length of a pendant mass of issued glass which may be accumulated before the lower portion of such mass will begin to travel downwardly at a speed appreciably greater than the rate of issuance of glass from the outlet will vary somewhat according to the head of glass in the forehearth, the temperature and viscosity of such glass, the composition of the glass, the heat insulating or conserving conditions at the outlet, etc.

However, for glass suitable to be manufactured into bottles or similar articles of glassware and at a temperature and in a condition of viscosity such as ordinarily are employed for "suspended charge" feeding, it is believed to be reasonably accurate to say that the lower end portion of the pendant mass of glass will not begin to break away and fall out of control until the length of such pendant mass is approximately three times the diameter of the lower end of the outlet. In "suspended charge" feeding of preformed charges, it is usual to apply an extrusive force, as by the downstroke of a plunger, to accelerate discharge of glass from the outlet to prolong beyond the normal the suspension period of an accumulating pendant mold charge mass. As hereinafter will become apparent, the use of a means for applying such an extrusive force may be dispensed with when the present invention is employed.

If the slightly bulbous lower end portion of a mass of glass in suspension from a discharge outlet, such as the pendant mass indicated at 11 in Fig. 2, were permitted to sag downwardly until it had broken out of control, the connecting glass between such rapidly falling end portion of glass and the glass at the outlet would be drawn out or attenuated rapidly so that the intervening glass would soon attain a thread-like form. However, according to the present invention, the lower end portion of the pendant mass 11 is not permitted to break out of control but before such action would take place, or at least before any undesirable attenuation has been effected, the halves of the parison mold, including both the body and neck forming portions of such mold, are closed at the charge receiving station about the slightly bulbous lower end portion of the pendant mass of glass and the neck pin 9 is simultaneously raised so as to be disposed in operative projected position in the neck forming portion of the parison mold.

When this step has been taken, the pendant mass of molten glass, which ordinarily will include the major portion of the mold charge to be obtained, is disposed within the closed parison mold, as shown in Fig. 3. The contact of the slightly bulbous lower end of the pendant mass of molten glass with the walls of the mold cavity, at the instant of closing of the halves of the parison mold, may be confined to contact in a narrow ring extending around the mold cavity, the width of this ring of contact varying according to the contour of the cavity of the particular parison mold that is in use at a given time.

In the manufacture of bottles, and of most other articles of blown glassware, the parison or initial glass shaping mold has a cavity which tapers, as at 12, Fig. 3, toward the lower or neck forming end thereof from a level which may be as high as midway of the height of the mold cavity. Even if the mold cavity should not have such taper, the diameter of the slightly bulbous lower end portion of the pendant mass of glass that has been formed in the manner just described preferably is such as to assure contact of walls of the mold cavity with such portion of the pendant mass of glass when or immediately after the halves of the mold have been closed about the pendant mass.

As soon as the halves of the parison mold have been closed about the pendant mass of molten glass, as illustrated in Fig. 3, suction may be applied to the unoccupied space in the parison mold below the glass therein. This may be done in any suitable known manner. For example, the neck pin may be provided with a central bore, such as indicated at 13, communicating through lateral ports with an annular groove 14 near the tip of the neck pin, so that a suction on the lower end of the glass in the closed parison mold will be effected when the bore 13 of the neck pin is connected with a source of sub-atmospheric pressure supply. The bore 13 in the neck pin may be connected with a source of sub-atmospheric pressure supply in any suitable known manner. If desired, provision may be made in a known manner, as by providing suction grooves in the inner periphery of the body of the parison mold, to apply sub-atmospheric pressure to lateral surfaces of the glass in the mold in addition to or as an incident of the step of applying sub-atmospheric pressure through the bore of the neck pin.

The exposure of the surface of the pendant mass of glass 11 to the air will have caused a relatively tough skin or enamel to form thereon. The frictional resistance occasioned by the contact of the periphery of the lower end portion of this mass of glass with walls of the mold cavity when the halves of the mold are closed and the toughness of the enveloping skin or enamel will tend to prevent downward movement of the surface or peripheral portion of the glass in the mold cavity in response to sub-atmospheric pressure, so that the partial vacuum within the lower end of the closed mold will be satisfied mainly by downward movement of the relatively hot and more plastic glass at the interior of the charge mass within the mold cavity. The peripheral portion of the glass in the mold will also be given lateral support when the walls of the mold cavity taper downwardly as shown.

The downward movement of relatively hot and plastic glass at the interior of the charge mass within the mold cavity which takes place will not only force glass of the charge downwardly into all available space around the tip of the neck pin, as shown in Fig. 4, but also will cause a pull on the relatively hot glass at the interior of the connecting portion of glass between the outlet and the upper end of the mold cavity.

Consequently, the glass intervening between the upper end of the cavity of the mold and the outlet will be attenuated, somewhat as indicated at 15 (Fig. 4). As soon as the downward pull on the glass between the outlet and the upper end of the mold has drawn sufficient glass for the charge below a predetermined severing plane, the glass in the mold is separated from the glass above the severing plane, as by the action of coacting shear blades 16. The shear blades 16 are shown in Fig. 4 before they have been closed and in Fig. 5 after they have been closed to effect severance of the charge in the mold from the oncoming glass. These shear blades may be of any suitable known type of construction and may be operated in any suitable known manner. Preferably they are thin blades and are operated to cut quickly through the glass and to open quickly so as to minimize chilling of the severed portion of glass and to prevent the oncoming glass from piling up on the shear blades.

It may be noted at this point that the attenuation of the intervening glass between the upper end of the mold cavity and the outlet aids in shaping the lower end of the succeeding charge mass.

The closing of the shear blades, as shown in Fig. 5, completes the charge. At the time of completion of the charge, all of such charge except a short upstanding upper end portion thereof will have been forced into contact at its surface with walls of the mold cavity. The shape and dimensions of this upstanding portion are such that it will quickly settle and flatten out into contact at its lateral surface with side walls of the mold cavity, substantially as shown in Fig. 6, but as such glass subsequently will be formed into the bottom of the article being made, it is not so important that the contact of its lateral surface with the side walls of the mold cavity should be of the same duration as that of the body of the charge. The suction on the glass in the mold cavity will aid in effecting quick settling of the upper end portion of the glass after the severing operation.

In the preceding descriptive matter, I have described the operations of closing the halves of the parison mold about the preformed suspended portion of the charge, the application of suction to the lower portion of the cavity of the closed inverted mold, and the closing of the shear blades to sever the completed charge from the glass of the embryonic next charge mass as occurring in the order just indicated. It, however, is to be understood that in actual practice all of these operations may take place so quickly as to be practically simultaneous. Thus, the suction may be applied at the instant of closing of the halves of the mold and the closing of the shears may follow very soon thereafter. Practically the entire body of the charge therefore may be caused to contact at its lateral and lower end surfaces with the walls of the mold cavity at about the same time.

The operations which have been described so far may all take place at the charge receiving station A, Fig. 1. Thereafter, the neck pin may be lowered and the mold table may be given an intermittent rotary movement to remove the charged mold from the charge receiving station and to bring another open parison mold to that station.

This intermittent rotary movement will move the charged mold to the next station, as to the station indicated at B in Fig. 1. Should settle blowing be desired, the same may be effected by the use of any suitable known means, either at station A or at station B or while the charged mold is being moved to that station. If settle blowing is to be effected after the mold leaves station A, the neck pin for each mold may be individual thereto and supported in a well-known manner for movement therewith as the mold table 5 is rotated.

However, a settle blowing step is believed not to be necessary in view of the application of sub-atmospheric pressure to the lower portion of the mold during the charging of the mold.

At station B, a counterblow head 17 may be applied to the lower end of the mold, and a baffle, such as indicated at 18, Fig. 7, applied to the top of the inverted mold, as shown in Fig. 7, or the mold may be reverted before the counterblow head and the bottom baffle are applied thereto. Air under pressure, applied through the counterblow head to the space vacated by the neck pin, will expand or counterblow the glass in the parison mold against the baffle 18 and produce a hollow cavity or bubble therein as indicated at 19, Fig. 7.

Thereafter, as during movement of the charge mold from the station B to the transfer station, indicated at C in Fig. 1, the parison mold may be reverted, if such reversion has not been previously effected. At the station C, the halves of the body of the parison mold may first be opened so as to permit the halves 18 of a finishing mold on the associate finishing mold table to close about the parison, as indicated in Fig. 8. The halves of the neck forming portion of the parison mold then may be opened so as to permit the counterblown parison to be carried in its finishing mold.

A blow head, such as indicated at 20 in Fig. 9, may be lowered to position to overlie the protruding neck portion of the parison in the blow mold and the parison may be blown to final form in the blow mold so as to produce a desired article of glassware, such as the bottle indicated at 21 in Fig. 9. This blowing of the parison to final form in the blow mold may take place at one or more of the stations to which the blow mold is moved in turn by successive intermittent rotary movements of the blow mold table.

At a predetermined point in the cycle of intermittent rotary movements of the finishing mold table, the blow mold may be opened and the finished article removed and placed on a suitable conveyor, such as indicated at 22, Fig. 1.

While I have shown and described the invention as performed by the use of a feeder having an uncontrolled outlet and a forming machine of the two-table type of construction associated with the feeder and so arranged that each parison mold on the parison mold table of that forming machine cooperates with the feeder in controlling the formation of the charge for that mold and the charging of the mold, it is to be understood that the invention may be carried into effect by the use of other known forms of feeding apparatus and associate glassware forming machines.

While the invention is particularly useful in completing in the cavity of a mold the formation of a charge that has been partially preformed in free suspension before the halves of the mold are closed about the pendant glass, it also is to be understood that it is within the purview of the broad invention completely to preform the charge in free suspension in any suitable known manner and then to close the halves of the mold about the preformed charge prior to or at the time of its separation from the parent body of glass, the invention then being primarily of utility in causing the preformed charge to fit exactly within the mold cavity and to assure contact at the same time of all points on the lateral and lower end surfaces of the preformed mold charge with walls of the mold cavity.

The invention is not to be limited beyond the terms of the appended claims.

I claim:

1. In the manufacture of hollow glassware by the use of a glass feeding container having a submerged discharge outlet and a glassware forming machine including a mold comprising partible sections, the method which comprises the steps of discharging glass from a supply body in said container through said outlet, causing the glass issuing from said outlet to accumulate in suspension in a solid mass to form a portion of a solid mold charge suitable for the cavity of said mold, closing the sections of said mold about said portion of the mold charge while the same is connected with the glass at the outlet by a solid column of glass of substantial area in cross-section, completing the charge desired by augmenting the glass in the mold with glass from the connecting column, and cutting off the glass of the charge by severing said connecting column.

2. In the manufacture of hollow glassware, the method which comprises the steps of preforming a portion of a solid charge suitable for the cavity of a vertically divided mold as part of a solid mass of molten glass in suspension below a feed outlet from which such glass has issued, closing the divisions of said mold about said preformed solid mold charge portion, and severing the connecting glass between the mold and said outlet.

3. In the manufacture of hollow glassware the method which comprises the steps of causing molten glass to issue from a submerged glass discharge outlet and to accumulate in a suspended solid column having a cross sectional area adjacent to its lower end approximating that of a portion of the cavity of a divided mold, closing the divisions of the mold about the lower end portion of said suspended solid column, applying suction to the lower end of the glass in the mold to aid in causing glass of said column to fill the cavity of the mold from its lower end for a substantial portion of the length of the mold cavity, and severing the column of glass above the mold.

4. In the manufacture of hollow glassware, the method which comprises preforming a solid portion of a charge suitable for the cavity of a vertically divided mold by discharging molten glass of suitable temperature and viscosity downwardly through an outlet into suspension from the outlet, closing the divisions of the mold about said preformed solid portion of the charge while said portion is still connected with glass at the outlet, attenuating the connecting glass between that in the mold and glass at the outlet, and severing the attenuated connecting glass.

5. In the manufacture of hollow glassware, the method which comprises establishing a continuous flow of molten glass of suitable viscosity downwardly from a discharge outlet at a rate sufficient to cause the discharged glass to accumulate in a solid column that will hold itself in suspension from the outlet until it attains a length at least two and a half times the diameter of said outlet, closing a divided mold about the lower end portion of said pendant solid column, applying suction in the cavity of said mold below the glass therein to aid in filling the lower end portion of said cavity and to attenuate the column of glass above the glass in the mold cavity, and severing the attenuated column of glass.

6. In the manufacture of hollow glassware, the method of obtaining a charge of molten glass adapted to fit in the cavity of a vertically divided mold without lapping, coiling or folding and simultaneously loading the cavity of said mold with glass of the charge, comprising the steps of preforming a portion of the charge as the lower end portion of a solid column of molten glass in suspension from a glass discharge outlet, closing the divisions of said mold about said preformed portion of the charge while it still retains its identity as the lower end portion of said solid column and while said column is being augmented by glass from said outlet, causing relatively hot and more fluid glass at the interior of said column to move downwardly toward the lower end of the cavity of the closed mold while retarding downward movement of the peripheral portion of the glass in the mold, and thereafter severing the column to separate therefrom the glass in the mold.

7. In the manufacture of hollow glassware, the method of loading a vertically divided mold which comprises preforming as part of a suspended solid column of molten glass a mass of glass of adequate size and proper shape to fit closely within the cavity of said mold and to comprise the major portion of the glass required for a charge for said mold, closing the divisions of said mold about said preformed mass of glass to confine such mass within the cavity of said mold while the glass of the mass is still connected with the remainder of the suspended solid column of glass, and thereafter severing said column to separate therefrom said preformed mass of glass and sufficient additional glass to complete the charge required for said mold.

8. In the manufacture of hollow glassware, the method which comprises discharging from a submerged glass feed outlet of a predetermined size molten glass of suitable viscosity and temperature and at a suitable rate to form in suspension from the outlet a solid column of substantially uniform cross-section but having a slightly bulbous lower end portion adapted to fit a portion of the cavity of an associate divided mold, closing the divided mold about said bulbous portion of said solid column, applying suction to the lower surface of the glass in the mold while retarding downward movement of the peripheral portion of said glass to cause relatively hot and plastic glass at the interior of said column to pass downwardly through the peripheral portion of the glass in the mold to fill the lower end portion of the mold cavity with glass and to attenuate the column above the glass in the mold, and severing the column at the place at which it has been attenuated.

9. In the manufacture of hollow glassware, the method which comprises the steps of preforming a portion of a solid charge suitable for the cavity of a vertically divided mold as part of a solid mass of molten glass in suspension below a feed outlet from which such glass has issued, closing the divisions of said mold about said preformed solid mold charge portion and thereby supporting the said portion to prevent it from falling out of control during the formation of the remainder of the charge, and severing the connecting glass between the mold and said outlet.

LLOYD G. BATES.